United States Patent
Gough et al.

(10) Patent No.: US 7,055,042 B1
(45) Date of Patent: May 30, 2006

(54) SYSTEM AND METHOD FOR SYNCHRONIZING A USER PASSWORD BETWEEN MAINFRAME AND ALTERNATIVE COMPUTER OPERATING ENVIRONMENTS

(75) Inventors: Richard Bruce Gough, Richardson, TX (US); Charles A. Crosby, Plano, TX (US); Ellen R. O'Connell, Plano, TX (US); Jennifer L. Deckard, Anna, TX (US); Steven R. Funk, Manassas, VA (US)

(73) Assignee: Electronics Data Systems Corporation, Plano, TX (US)

( * ) Notice: Subject to any disclaimer, the term of this patent is extended or adjusted under 35 U.S.C. 154(b) by 0 days.

(21) Appl. No.: 09/276,407

(22) Filed: Mar. 25, 1999

(51) Int. Cl.
*H04L 9/00* (2006.01)
*H04L 9/32* (2006.01)

(52) U.S. Cl. .................. 713/202; 713/201; 713/202
(58) Field of Classification Search ............ 713/200, 713/201, 202, 184
See application file for complete search history.

(56) References Cited

U.S. PATENT DOCUMENTS

| | | | | |
|---|---|---|---|---|
| 5,719,941 A | * | 2/1998 | Swift et al. ............... | 340/5.54 |
| 5,818,936 A | * | 10/1998 | Mashayekhi ............... | 713/152 |
| 5,832,211 A | | 11/1998 | Blakley, III et al. ...... | 395/188.01 |
| 5,838,903 A | | 11/1998 | Blakley, III et al. ...... | 395/188.01 |
| 5,862,323 A | | 1/1999 | Blakley, III et al. ...... | 395/188.01 |
| 6,101,608 A | * | 8/2000 | Schmidt et al. ............ | 713/162 |
| 6,128,738 A | * | 10/2000 | Doyle et al. .............. | 709/228 |

* cited by examiner

*Primary Examiner*—Ly V. Hua
(74) *Attorney, Agent, or Firm*—Baker Botts L.L.P.

(57) ABSTRACT

A system (8) for synchronizing a user password between mainframe (10) and alternative (11, 12) computer operating environments includes a mainframe access module (20) that receives a current user password from an associated mainframe client computer (22) and provides a user with access to selected applications or data in the mainframe operating environment (10) according to the current user password. The mainframe access module (20) also receives a new user password in response to providing the access and communicates the new user password. A mainframe platform (14, 16, 18) coupled to the mainframe access module (20) receives the new user password, stores the new user password, and communicates the new user password. A messaging platform (24, 26, 28) coupled to the mainframe platform receives the new user password from the mainframe platform (14, 16, 18) and communicates a broadcast message containing the new user password. Multiple alternative platforms (30, 36) each coupled to the messaging platform (24, 26, 28) receive the broadcast message from the messaging platform (24, 26, 28) and store the new user password to synchronize the new user password between the mainframe (10) and alternative (11, 12) computer operating environments. Each alternative platform (30, 36) is capable of receiving the new user password from an associated alternative platform client computer (34, 40) and, in response, providing the user with access to the alternative platform client computer (34, 40).

20 Claims, 8 Drawing Sheets

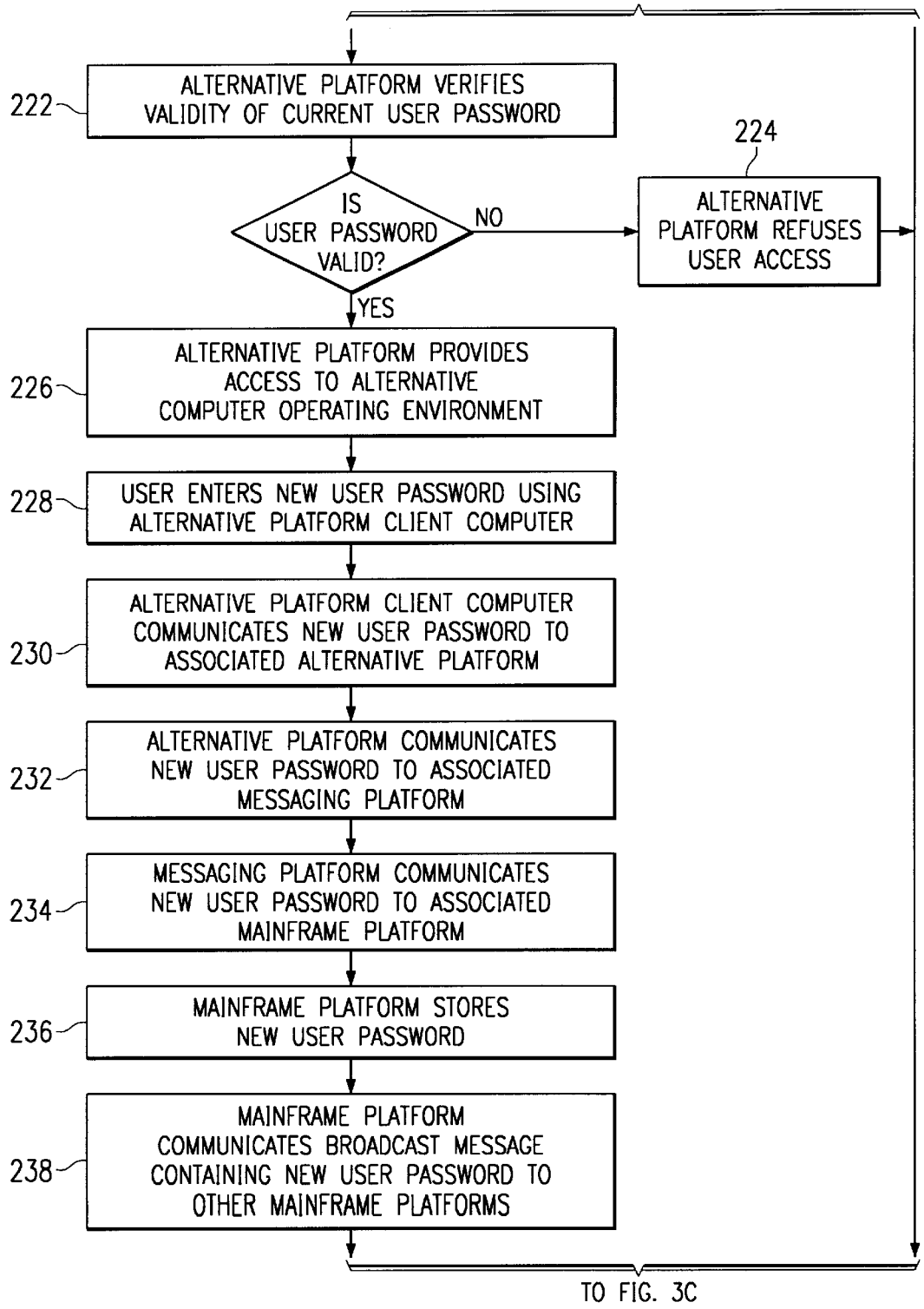

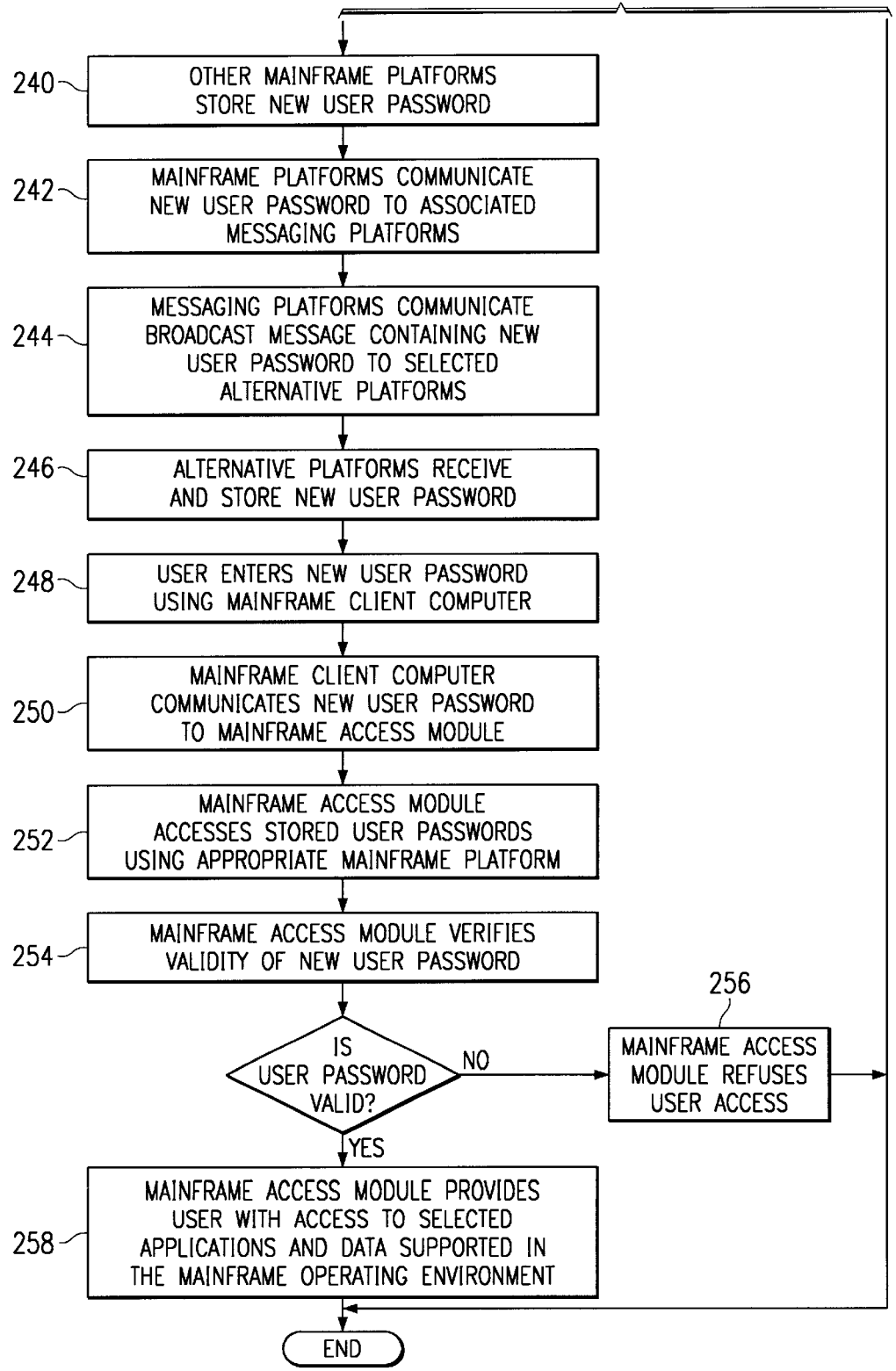

SYSTEM AND METHOD FOR SYNCHRONIZING A USER PASSWORD BETWEEN MAINFRAME AND ALTERNATIVE COMPUTER OPERATING ENVIRONMENTS

TECHNICAL FIELD OF THE INVENTION

This invention relates generally to computer systems, and more specifically to a system and method for synchronizing a user password between mainframe and alternative computer operating environments.

BACKGROUND OF THE INVENTION

Many businesses and other organizations rely upon multiple computer systems that each support either a mainframe or an alternative computer operating environment. Mainframe computer systems typically support legacy applications created before the development and wide-spread deployment of distributed computing architectures. These legacy applications provide mainframe users with access to vast quantities of information typically stored in large shared databases. After the user provides a password to gain access to the mainframe operating environment, the user may be presented with a list of applications the user is entitled to access. The user may need to supply an additional password to use one or more of these applications, or may be able to use some or all of the applications without providing an additional password or other security information. In contrast to mainframe computer systems, alternative platform computer systems such as client-server networks typically rely on a distributed computing architecture in which one or more servers control network traffic and manage network devices, such as storage devices or printers, while each client supports user applications. An alternative platform user provides a password to gain access to a particular client computer, rather than an associated server, and typically must provide an additional password or other security information to access particular applications supported on the client computer. By integrating mainframe and alternative platform computer systems, businesses and other organizations may provide users with access to applications and data through either a mainframe or alternative platform client computer, depending on the location of these users and other factors.

As computer systems and the information needs of users continue to become increasingly complex and geographically distributed, security issues have become increasingly important. Although both mainframe and alternative platform computer systems require a user to provide a password to access associated applications and data, these systems often use different command formats, password rules, and procedures for changing passwords. As a result, many users must enter one user password to access the mainframe operating environment and one or more user passwords to access each alternative operating environment, while maintaining all such passwords in their memory or in their records. Furthermore, since users frequently forget at least one of their multiple passwords, demand on help desk and other administrative services to change or bypass the forgotten passwords may be substantially increased.

Even if a user were able to adopt a single password suitable for both mainframe and alternative computer systems, a user may elect to change his or her password. In addition, security software typically requires a user to periodically change his or her password. Thus, even if the user has a single password suitable for all mainframe and alternative platform computer systems, the user must personally synchronize, after each change election and at each required change interval, the user password between the various operating environments by submitting and validating a new password at the mainframe client computer and at each alternative platform client computer the user wishes to access. This process is inconvenient, inefficient, time-consuming, and often ineffective since users may neglect to enter the new password in every operating environment to which they may need access.

Some mainframe computer systems synchronize passwords between different mainframe platforms within a mainframe operating environment by broadcasting a password change made in connection with one mainframe platform to some or all of the other mainframe platforms. This technique, however, does not synchronize passwords between mainframe and alternative platform computer systems, which may have vastly different command formats and password rules. Furthermore, because many alternative platform computer systems are widely distributed, involving a large number of client and server computers, even extending this technique to include broadcasting each password change from the mainframe platform throughout each alternative operating environment would overburden the mainframe platform due to the tremendous amount of message traffic. Thus, businesses and other organizations have been unable to efficiently and effectively integrate mainframe and alternative platform computer systems in a secured environment supporting password synchronization.

SUMMARY OF THE INVENTION

According to the present invention, disadvantages and problems associated with the use of user passwords in integrated or cooperating mainframe and alternative computer operating environments have been substantially reduced or eliminated.

According to one embodiment of the present invention, a system for synchronizing a user password between mainframe and alternative computer operating environments includes a mainframe access module that receives a current user password from an associated mainframe client computer and provides a user with access to selected applications or data in the mainframe operating environment according to the current user password. The mainframe access module also receives a new user password in response to providing the access and communicates the new user password. A mainframe platform coupled to the mainframe access module receives the new user password, stores the new user password, and communicates the new user password. A messaging platform coupled to the mainframe platform receives the new user password from the mainframe platform and communicates a broadcast message containing the new user password. Multiple alternative platforms each coupled to the messaging platform receive the broadcast message from the messaging platform and store the new user password to synchronize the new user password between the mainframe and alternative computer operating environments. Each alternative platform is capable of receiving the new user password from an associated alternative platform client computer and, in response, providing the user with access to the alternative platform client computer.

The system and method of the present invention provide a number of important technical advantages. Unlike previous techniques, which require a user to personally synchronize his or her user password by submitting and validating the password at each mainframe and alternative platform client computer the user may wish to access, the present invention automatically synchronizes the user password between the mainframe and alternative computer operating environments without overburdening mainframe platforms with substantially increased message traffic. Thus, a user need remember only a single user password and may use that password to access applications or data using any mainframe or alternative platform client computer within the system. Furthermore, unlike with previous techniques, when changing his or her password at required intervals or for any other reason, the user only has to change the password using one client computer in either the mainframe or alternative operating environment. Other technical advantages are apparent to those skilled in the art from the following figures, descriptions, and claims.

BRIEF DESCRIPTION OF THE DRAWINGS

To provide a more complete understanding of the present invention and further features and advantages thereof, reference is now made to the following description taken in conjunction with the accompanying drawings, in which:

FIGS. 3A, 3B and 3C are flowcharts illustrating an exemplary method of synchronizing a user password between mainframe and alternative computer operating environments when a password change is initiated using an alternative platform client computer.

DETAILED DESCRIPTION OF THE INVENTION

Figure 1:
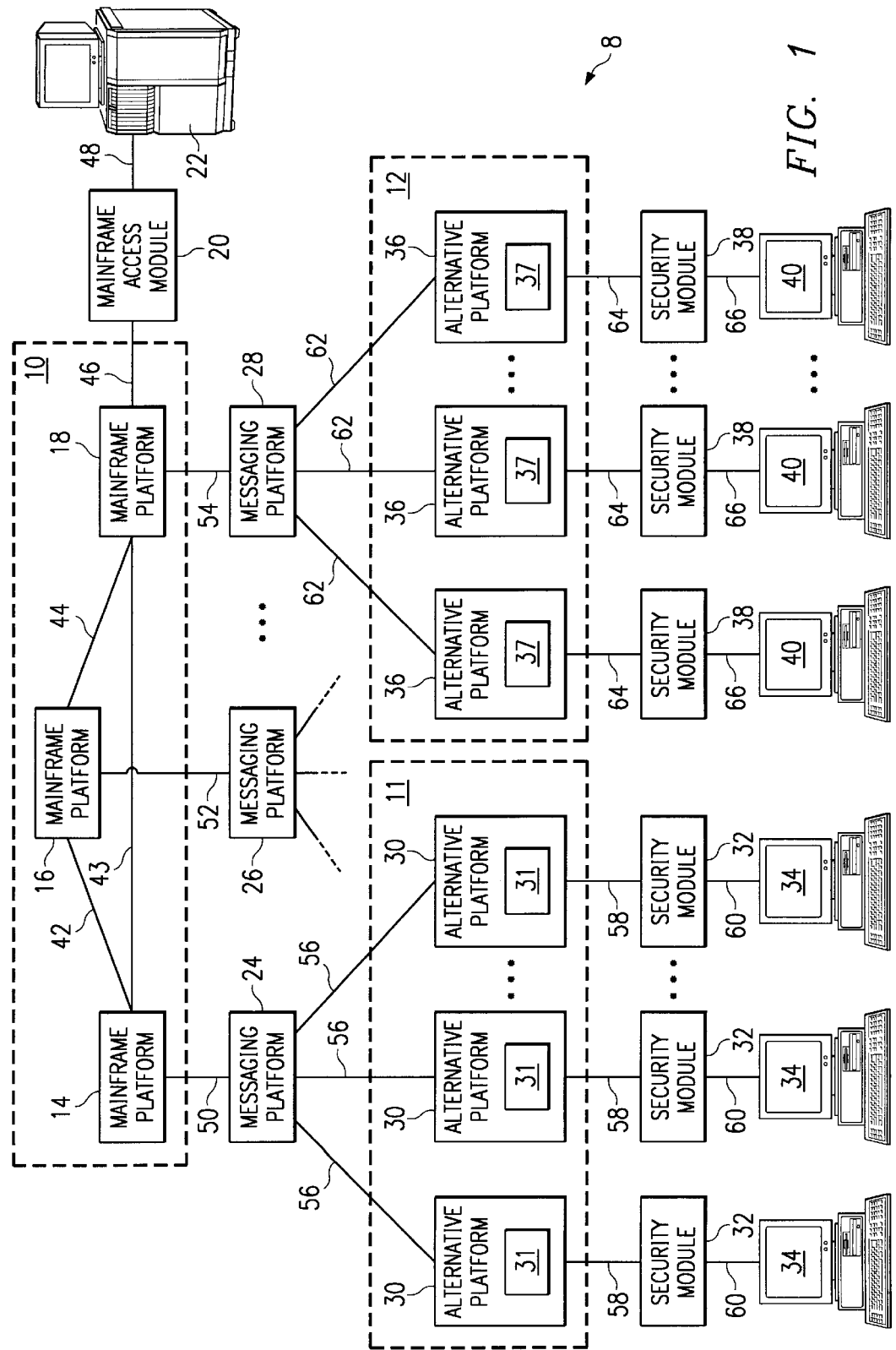
FIG. 1 illustrates an exemplary system for synchronizing a user password between mainframe and alternative computer operating environments according to the present invention.
Figure 2A:
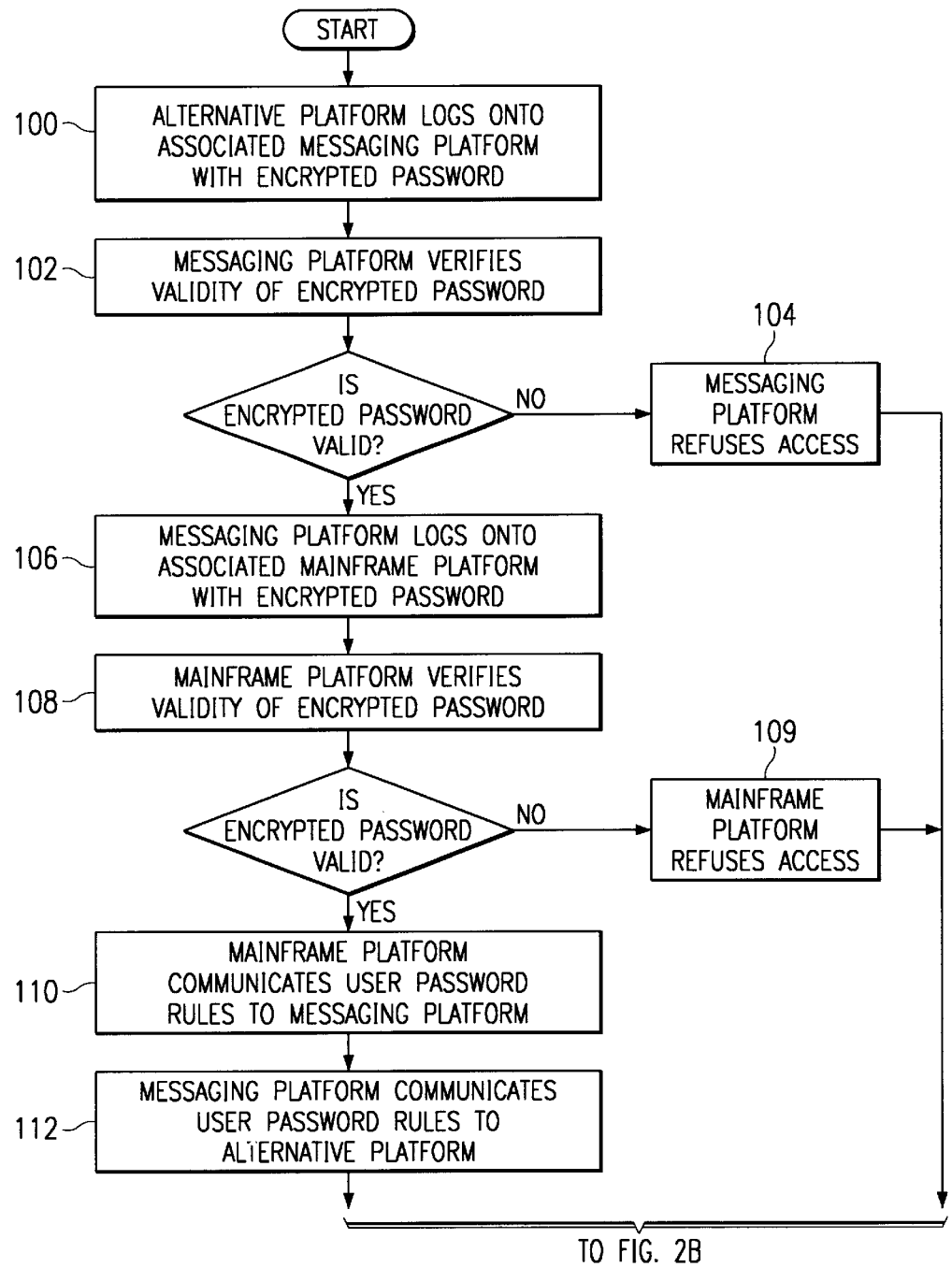
FIGS. 2A, 2B, 2C and 2D are flowcharts illustrating an exemplary method of synchronizing a user password between mainframe and alternative computer operating environments when a password change is initiated using a mainframe client computer.
Figure 2B:
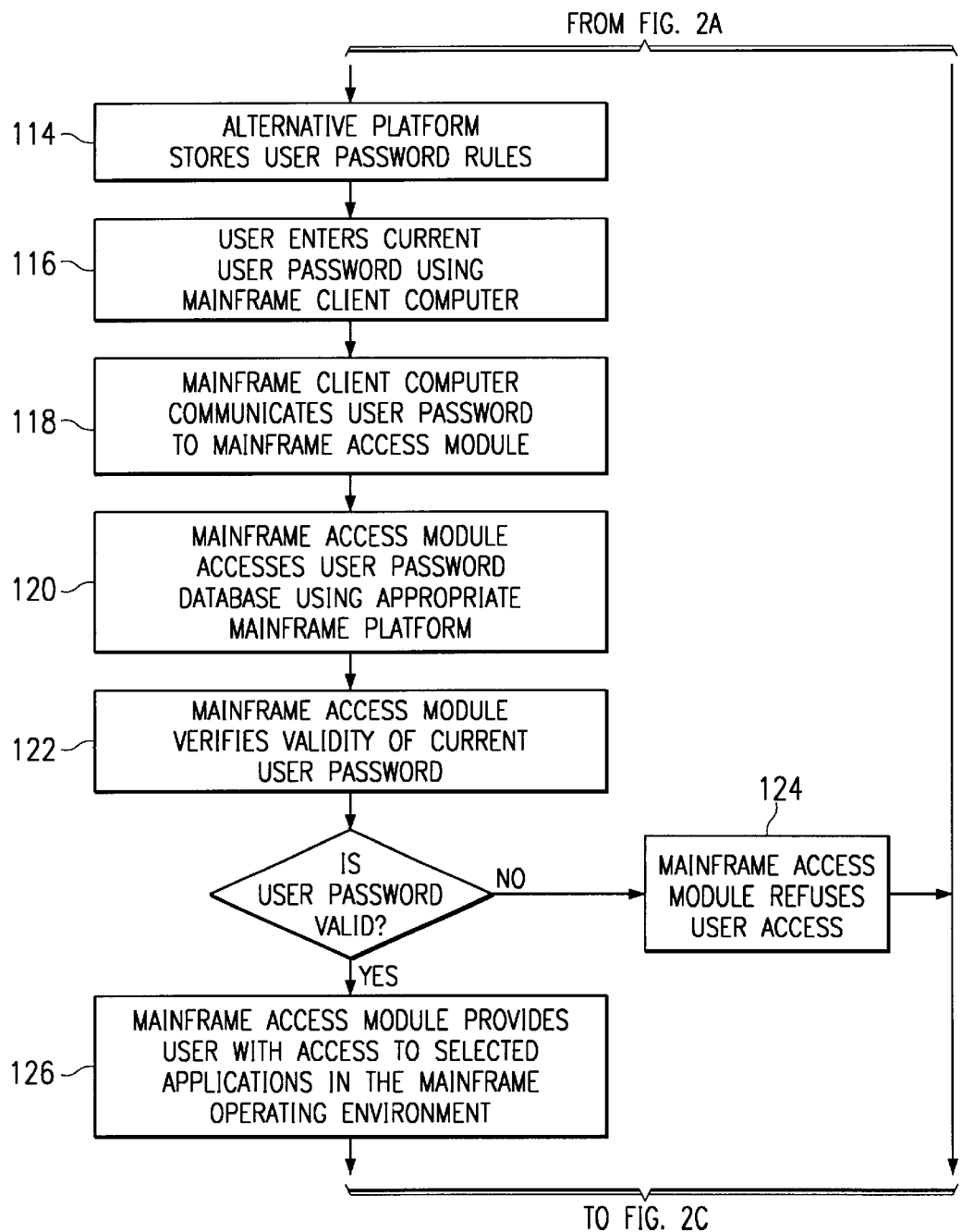
Figure 2C:
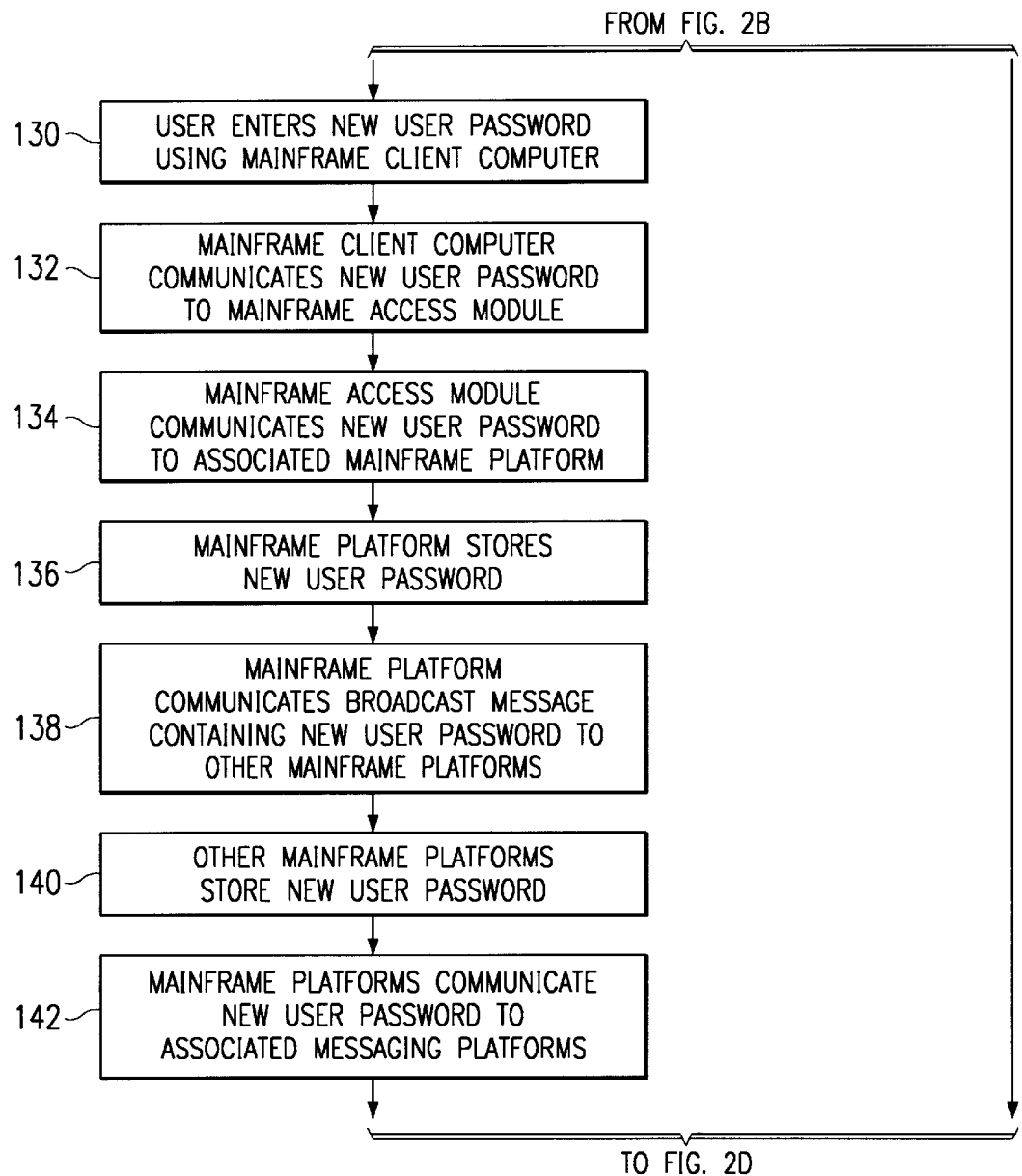
Figure 2D:
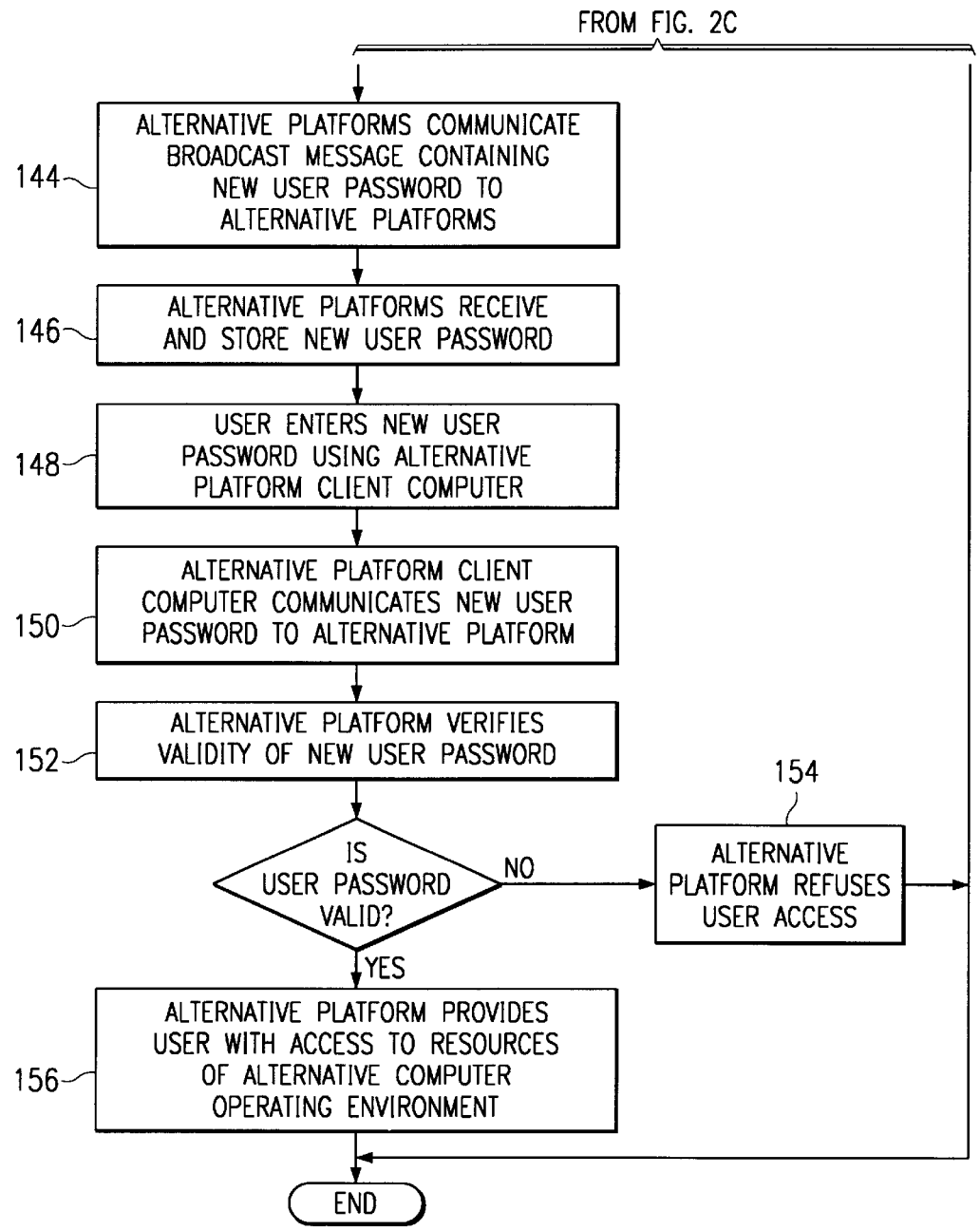

FIG. 1 illustrates an exemplary system 8 for synchronizing user passwords between mainframe computer operating environment 10 and alternative computer operating environments 11 and 12. System 8 allows a user to change his or her user password using a mainframe client computer 22 associated with mainframe operating environment 10 and later provide the new user password using an alternative platform client computer 34 or 40 associated with alternative operating environment 11 or 12, respectively, to access applications and data in alternative operating environments 11 or 12, respectively. In addition, system 8 allows the user to change his or her user password using alternative platform client computer 34 or 40 and later provide the new user password using mainframe client computer 22 to access applications and data in mainframe operating environment 10.

Mainframe client computer 22 provides a user interface suitable to access and interact with the applications and data within mainframe operating environment 10. Mainframe client computer 22 may be a personal computer, workstation, or any other suitable processing and communications device. Mainframe client computer 22 may present a text-based, graphical, or any other type of interface suitable for communication with a user. Mainframe client computer 22 receives a current or new user password from the user, possibly in association with a user identification or any other suitable security information, and communicates the user password and security information to mainframe access module 20 using link 48.

Mainframe access module 20 controls access to applications and data in mainframe operating environment 10. In one embodiment, mainframe client computer 22 and mainframe access module 20 are associated with a particular mainframe platform 18. Although not specifically illustrated, the present invention contemplates multiple mainframe client computers 22 and mainframe access modules 20 for each mainframe platform 14, 16, and 18. Mainframe access module 20 receives a current user password and associated security information, such as a user identification, from mainframe client computer 22 and attempts to verify the validity of the supplied user password with respect to its correctness, syntax, and other suitable characteristics. Mainframe access module 20 compares the received password to a user password stored in memory integral to mainframe platform 18 or at any other suitable storage location. Mainframe access module 20 may compare the received and stored user passwords in cooperation with mainframe platform 18.

Mainframe access module 20 may also verify the validity of any supplied user identification in a similar manner. In one embodiment, it may be desirable to verify the validity of the user identification to ensure that a password change is not propagated to other computer operating environments when the password is associated with, as an example and not by way of limitation, a root user identification or administrator user identification. In response to verifying the validity of the current user password and possibly the user identification, mainframe access module 20 provides mainframe client computer 22 with access to some or all applications and data in mainframe operating environment 10. In one embodiment, mainframe access module 20 provides mainframe client computer 22 with access only to the selected applications and data to which the user is entitled. The user may be required to supply an additional password or other security information to access particular applications, according to the particular needs of the organization.

Mainframe access module 20 also allows an authorized user to change his or her user password. In one embodiment, mainframe access module 20 uses mainframe client computer 22 to periodically prompt the user to change his or her user password as a security precaution. When a user decides or is prompted to change his or her user password, the user provides a new password using mainframe client computer 22. Mainframe access module 20 receives the new user password from mainframe client computer 22, validates the form, syntax, and any other characteristics of the new user password according to the specified rules, and communicates the new user password to mainframe platform 18 using link 46. Links 46 and 48 may include any wireline, wireless, or other communication links suitable to support communications between mainframe client computer 22, access module 20, and platform 18. Mainframe access module 20 may operate on mainframe platform 18, mainframe client computer 22, or a separate dedicated computer.

Mainframe platforms 14, 16, and 18 support mainframe applications and data. Mainframe platforms 14, 16, and 18 support Multiple Virtual Storage (MVS), OS/390, or any other suitable mainframe operating system. Mainframe platforms 14, 16, and 18 are coupled to one another within mainframe operating environment 10 using links 42, 43, and 44, which may include any wireline, wireless, or other suitable communication links. Although only mainframe platforms 14, 16, and 18 are specifically discussed, mainframe operating environment 10 may include any suitable number of mainframe platforms and associated links, according to particular needs.

In one particular embodiment, mainframe platform 14 is a primary mainframe platform that stores the user passwords of all users authorized to access any resources within either mainframe operating environment 10 or alternative operating environment 11 or 12. In this embodiment, mainframe platforms 16 and 18 are secondary mainframe platforms that store user passwords only for users associated in some manner with the particular mainframe platform 16 or 18. For example, each mainframe platform 14, 16, and 18 may service an associated geographic region. Mainframe platform 14 might be located in a North America facility and store the user passwords of all users, mainframe platform 16 might be located in and store the user passwords of users generally working in or otherwise associated with an Asian facility, and mainframe platform 18 might be located in and store the user passwords of users generally working in or otherwise associated with a European facility. Such geographic distribution may allow mainframe platforms 14, 16, and 18 to more efficiently and effectively service local users over a vast geographic region. Furthermore, the user passwords may also be stored in association with more than one mainframe platform 14, 16, or 18. Such data redundancy may prevent loss of information in the event one of the mainframe platforms 14, 16, or 18 becomes damaged or disabled. Maintaining data integrity is extremely important when handling user passwords that provide access to critical applications and data. The present invention contemplates any suitable distribution of user passwords among mainframe platforms 14, 16, and 18. The present invention further contemplates any appropriate hierarchical or non-hierarchical relationship between the mainframe platforms within mainframe operating environment 10.

When a user changes his or her user password using mainframe client computer 22, mainframe platform 18 receives the new user password and communicates the new user password to mainframe platforms 14 and 16 according to previous techniques. Mainframe platforms 14 and 16 store the new password for later use in providing access to the resources of mainframe operating environment 10. In addition, according to the present invention and unlike previous systems, mainframe platforms 14, 16, and 18 communicate the new user password to associated messaging platforms 24, 26, and 28, respectively, which are each associated with a corresponding alternative operating environment. As discussed more fully below, messaging platforms 24, 26, and 28 then communicate broadcast messages containing the new user password to corresponding alternative platforms 30 and 36 for synchronization of the new user password between mainframe operating environment 10 and one or more alternative computer operating environments. For simplicity, the alternative operating environment associated with messaging platform 26 is not specifically illustrated or discussed.

In one embodiment, mainframe platforms 14, 16, and 18 may communicate the new user password only to one or more selected messaging platforms 24, 26, and 28 according to the need or ability of the user to access associated alternative operating environments. For example, if the user only needs to access applications and data associated with alternative operating environment 11, then mainframe platform 14 may communicate the new user password to messaging platform 24, but mainframe platform 18 may not communicate the new password to messaging platform 28.

The present invention contemplates mainframe platforms 14, 16, and 18 communicating a broadcast message containing the new user password to some or all associated message platforms 24, 26, and 28, respectively. As discussed more fully below, mainframe platforms 14, 16, and 18 also receive from associated messaging platforms 24, 26, and 28, respectively, and store new user passwords when password changes are initiated at an alternative platform client computer 34 or 40, providing an important technical advantage over previous techniques.

Alternative platform client computers 34 and 40 provide a user interface to applications and data supported in alternative computer operating environments 11 and 12, respectively. Alternative platform client computers 34 and 40 may be personal computers, workstations, or any other suitable processing and communication devices. Alternative platform client computers 34 and 40 may present a text-based, graphical, or any other type of interface suitable for communication with a user. Alternative platform client computer 34 or 40 receives a current or new user password from the user, possibly in association with a user identification or other suitable security information, and communicates the user password and security information to security module 32 or 38, respectively, using link 60 or 66, respectively. Links 60 and 66 may be any suitable wireline, wireless, or other communication links.

Security modules 32 and 38 provide local security to restrict access to alternative platforms 30 and 36. In one embodiment, each security module 32 or 38 operates on a corresponding alternative platform client computer 34 or 40, respectively, although the present invention contemplates security modules 32 and 38 each operating on dedicated computers or on associated alternative platforms 30 and 36, respectively. Security modules 32 and 38 communicate user passwords, user identifications, and other security information received from alternative platform client computers 34 and 40, respectively, to alternative platforms 24 and 28, respectively.

Alternative platforms 30 and 36 cooperate with associated alternative platform client computers 34 and 40, respectively, to support the use of applications and data within alternative computer operating environments 11 and 12, respectively. In one embodiment, alternative platforms 30 and 36 are server computers, each incorporating an application programming interface (API) or any other suitable software 31 or 37, respectively. At initialization of system 8, alternative platforms 30 and 36 log onto associated messaging platforms 24 and 28, respectively, using an encrypted password. Messaging platforms 24 and 28 log onto associated mainframe platforms 14 and 18, respectively, using the same or a different encrypted password. Mainframe platforms 14 and 18 then communicate stored user password rules to messaging platforms 24 and 28, respectively, and messaging platforms 24 and 28 then communicate the user password rules to alternative platforms 30 and 36, respectively. The password rules define the format, syntax, and other requirements for valid user passwords and identifications. Alternative platforms 30 and 36 store the user password rules in a storage location directly or indirectly accessible to modules 31 and 37, respectively.

Alternative platforms 30 and 36 receive current user passwords and security information such as user identifications from associated security modules 32 and 38, respectively. Modules 31 and 37, respectively, ensure that the received user passwords and user identifications comply with the stored password rules and attempt to verify the validity of the user password and user identifications. Alternative platforms 30 and 36 compare the received password to stored user passwords, which may be retrieved from any suitable storage location. In one embodiment, alternative platforms 30 and 36 use mainframe platforms 14 and 18, respectively, to retrieve the stored passwords from databases associated with mainframe platforms 14 and 18, respectively.

Alternative platforms 30 and 36 may verify the validity of user identifications in a similar manner. In one embodiment, it may be desirable to verify the validity of the user identification to ensure that a password change is not propogated to other computer operating environments when the password is associated with, as an example and not by way of limitation, a root user identification or administrator user identification. In response to verifying the validity of current user passwords, and possibly the user identifications, alternative platforms 30 and 36 provide users associated with alternative platform client computers 34 and 40, respectively, with access to some or all applications and data in alternative platform operating environments 11 and 12, respectively. In a particular embodiment, alternative platforms 30 and 36 provide such users with access only to alternative platform client computers 34 and 40, respectively, and users must provide an additional password or any other security information to access one or more particular applications and data within alternative operating environments 11 and 12, respectively.

Alternative platforms 30 and 36 also allow authorized users to change their user passwords. In one embodiment, alternative platforms 30 and 36 and modules 31 and 37, respectively, use alternative platform client computers 34 and 40, respectively, to periodically prompt users to change their passwords as a security precaution or for any other reason. To change the password, the user provides a new user password using alternative platform client computer 34 or 40, which then communicates the new user password to alternative platform 30 or 36, respectively. Alternative platform 30 or 36 receives the new user password from associated client computer 34 or 40, respectively, and communicates the new user password to associated messaging platform 24 or 28, respectively, using link 56 or 62, respectively.

In general, messaging platforms 24, 26, and 28 couple mainframe operating environment 10 to one or more alternative operating environments and prevent the mainframe platforms 14, 16, and 18 from being overburdened in accordance with the operation of the present invention. Although messaging platforms 24, 26, and 28 may in general be any suitable processing and communications devices, in one embodiment messaging platforms 24, 26, and 28 are SUN computers running a version of UNIX. Links 56 and 62 coupling messaging platforms 24 and 28 to alternative platforms 30 and 36, respectively, and links 50, 52, and 54 coupling messaging platforms 24, 26, and 28 to mainframe platforms 14, 16, and 18, respectively, may be any wireline, wireless, or other suitable communication links. In a particular embodiment, MQ SERIES (an IBM product) manages the communications between mainframe platforms 14, 16, and 18, messaging platforms 24, 26, and 28, and associated alternative platforms. To ensure reliable communications, MQ SERIES assigns each message to a queue, sends the message to the intended recipient, and removes the message from the queue only if the recipient verifies receipt of the message. The present invention contemplates suitable links (not shown) coupling one or more messaging platforms 24, 26, and 28 to support communications between these messaging platforms.

When a password change is initiated using mainframe client computer 22, one or more messaging platforms 24, 26, and 28 receive the new password from associated mainframe platforms 14, 16, and 18, respectively, and communicate broadcast messages containing the new password to some or all associated alternative platforms. When a password change is initiated using an alternative platform client computer 34 or 40, messaging platform 24 or 28, respectively, receives the new passwords from associated alternative platform 30 or 36 and communicate the new password to some or all other alternative platforms 30 and 36 as well as to the associated mainframe platform 14 or 18, respectively. Messaging platforms 24, 26, and 28 reduce the message traffic that mainframe platforms 14, 16, and 18 must handle according to the present invention. Rather than send a broadcast message to each alternative platform 30, for example, mainframe platform 14 need only send a single message to its associated messaging platform 24. Messaging platform 24 sends a broadcast message to each appropriate alternative platform 30. In a particular embodiment, messaging platforms 24, 26, and 28 communicate the new user password only to one or more selected alternative platforms according to the need or the ability of the user to access associated alternative operating environments. For example, if the user only uses an alternative platform client computer associated with one alternative platform client computer 34, then messaging platform 24 may only communicate the new password to the particular corresponding alternative platform 30. This may further reduce message traffic within system 8. The present invention contemplates messaging platforms 24, 26, and 28 communicating the new password to some or all alternative platforms, according to particular needs.

As will be apparent to those skilled in the art, system 8 synchronizes user passwords between mainframe computer operating environment 10 and alternative computer operating environments 11 and 12. Although previous systems communicate a new user password to some or all mainframe platforms within mainframe operating environment 10, they do not reduce or eliminate the problems associated with user passwords in multiple operating environments. In system 8, once alternative platforms 30 and 36 have stored the new user password, the password is synchronized between mainframe operating environment 10 and alternative environments 11 and 12. As a result, the user can provide the new password using any alternative platform client computer 30 or 34 to access applications and data in alternative platform environment 11 or 12, respectively. Furthermore, a new password changed using alternative platform client computer 34 or 40 is synchronized between mainframe operating environment 10 and alternative operating environments 11 and 12 once the new password is stored at all appropriate mainframe platforms 14, 16, and 18 and at all appropriate alternative platforms 30 and 36. As a result, system 8 reduces or eliminates inadequacies associated with previous systems while providing a number of important technical advantages over such previous systems.

FIG. 2 is a flowchart illustrating an exemplary method of synchronizing a user password between mainframe and alternative computer operating environments when a password change is initiated using mainframe client computer 22. The method begins at step 100, where alternative platforms 30 and 36 log onto associated messaging platforms 24 and 28, respectively, with the same or different encrypted password. Messaging platforms 24 and 28 verify the validity of the encrypted passwords at step 102. If an encrypted password is not valid, messaging platform 24 or 28 denies access to the associated alternative platform 30 or 36, respectively, at step 104, and the method ends. Messaging platforms 24 and 28 log onto associated mainframe platforms 14 and 18 with the same or different encrypted passwords at step 106. Mainframe platforms 14 and 18 verify the validity of the encrypted passwords at step 108. If an encrypted password is not valid, mainframe platform 14 or 18 denies access to the associated messaging platform 24 or 28, respectively, at step 109, and the method ends.

Some or all alternative platforms 30 and 36 may log onto associated messaging platforms 24 and 28, respectively, independent of some or all messaging platforms 24 and 28 logging onto associated mainframe platforms 14 and 18, respectively, and may do so serially, more or less simultaneously, or in any other appropriate manner. If the encrypted passwords are valid, the mainframe platforms 14 and 18 communicate the user password rules to messaging platforms 24 and 28, respectively, at step 110, and the messaging platforms 24 and 28 communicate the user password rules to alternative platforms 30 and 36, respectively, at step 112. Alternative platforms 30 and 36 store user password rules at step 114. The user password rules may be temporarily stored at messaging platforms 24 and 28 before being communicated to alternative platforms 30 and 36, according to operation of system 8.

At step 116, a user provides a current user password using mainframe client computer 22, possibly along with a user identification or other security information. Mainframe client computer 22 communicates the user password and security information to mainframe access module 20 at step 118. At step 120, mainframe access module 20 accesses stored user passwords using mainframe platform 18 or otherwise. Mainframe platform 18 may be a primary, secondary, or any other suitable mainframe platform. Mainframe access module 20 compares the current user password with stored user password information at step 122 to verify the validity of the current user password. If the current user password is not valid, mainframe access module 20 refuses the user access to applications and data in mainframe operating environment 10 at step 124, and the method ends. Mainframe access module 20 may also validate a user identification. If the current user password and user identification are valid, mainframe access module 20 provides the user with access to some or all applications and data supported within mainframe operating environment 10 at step 126. Mainframe access module 20 may provide the user with access to all the applications and data in mainframe operating environment 10 or may provide the user with access to only selected applications and data according to the current user password.

At step 130, the user provides a new user password using mainframe client computer 22. Mainframe client computer 22 communicates the new user password to mainframe access module 20 at step 132, and the mainframe access module 20 communicates the new user password to associated mainframe platform 18 at step 134. At step 136, mainframe platform 18 stores the new user password and, at step 138, communicates a broadcast message containing the new user password to some or all of the other mainframe platforms 14 and 16. In a particular embodiment, mainframe platform 18 may communicate the new password only to selected other mainframe platforms. Mainframe platforms 14 and 16 that receive the new user password store it at step 140.

At step 142, mainframe platforms 14, 16, and 18 communicate a broadcast message containing the new user password to one or more associated messaging platforms 24, 26, and 28, respectively. In one embodiment, mainframe platforms 14, 16, and 18 communicate the broadcast message only to selected messaging platforms 24, 26, or 28, corresponding to alternative operating environments to which the user may have access or need access in the future, although the present invention contemplates the broadcast message being communicated to all messaging platforms 24, 26, and 28. At step 144, messaging platforms 24, 26, and 28 communicate a broadcast message containing the new user password to some or all associated alternative platforms. In one embodiment, messaging platforms 24, 26, and 28 communicate the new password only to selected alternative platforms 30 and 36, but the present invention contemplates the broadcast message being communicated to all alternative platforms 30 and 36. At step 146, alternative platforms 30 and 36 receive and store the new user password to synchronize it between mainframe computer operating environment 10 and alternative computer operating environments 11 and 12.

At step 148, the user provides the new user password using alternative platform client computer 34 or 40. Alternative platform client computer 34 or 40 communicate the new user password to associated alternative platform 30 or 36, respectively, at step 150, and alternative platform 30 or 36 attempt to verify the validity of the new user password at step 152. If the new user password is invalid, alternative platform 30 or 36 denies the user access at step 154. If the new user password is valid, alternative platform 30 or 36 provides alternative platform client computer 34 or 40, respectively, access to applications and data supported in alternative computer operating environment 11 or 12, respectively, at step 156. In a one embodiment, alternative platform 30 or 36 provides the user with access only to alternative platform client computer 34 or 40, respectively, and the user must provide an additional password or other security information to access the applications and data within alternative computer operating environment 11 or 12, respectively. After the user is provided access at step 156, the method ends.

Figure 3A:
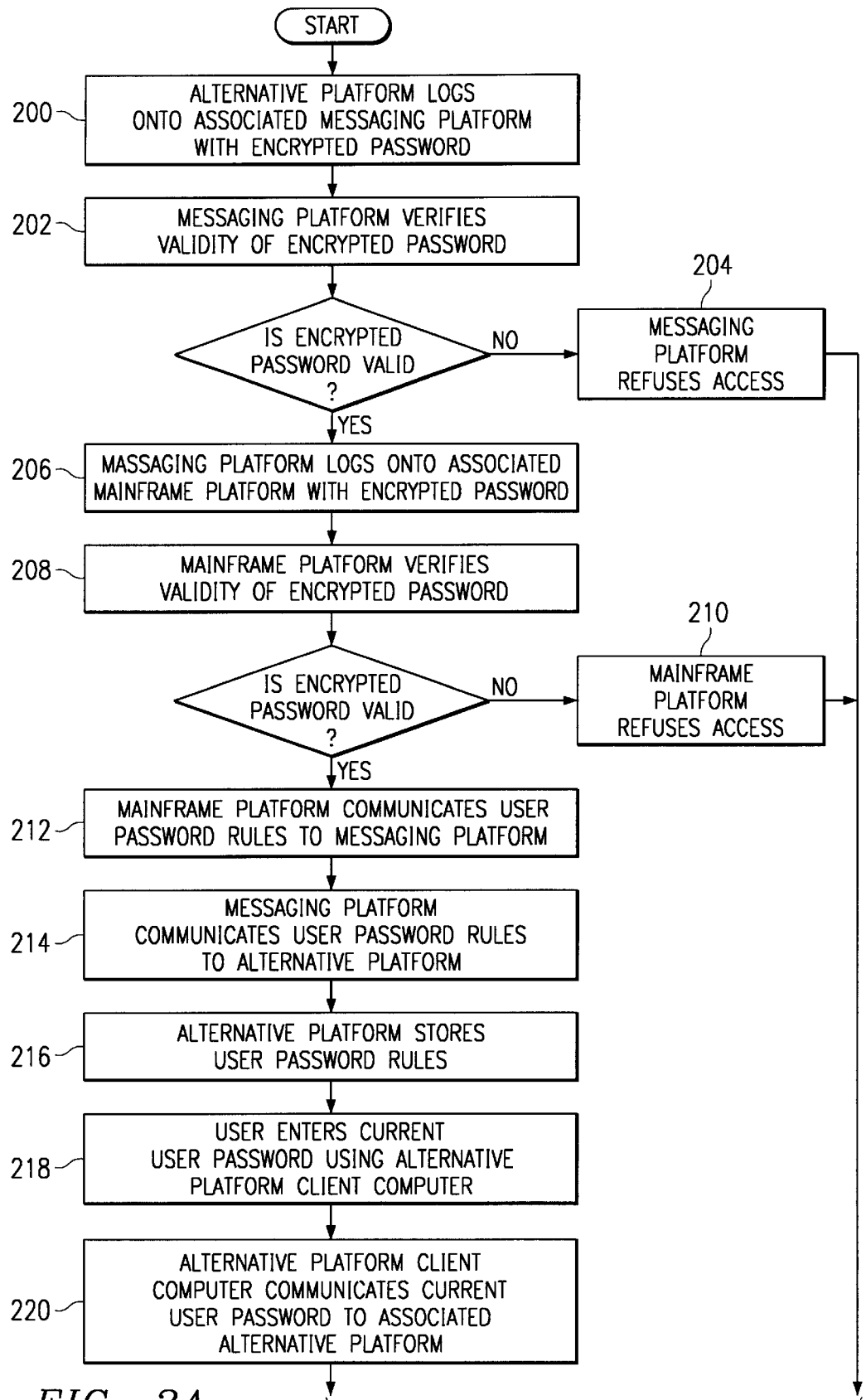

FIG. 3 is a flowchart illustrating an exemplary method of synchronizing a user password between mainframe and alternative computer operating environments when a password change is initiated using alternative platform client computer 34 or 40. The method begins at step 200, where alternative platforms 30 and 36 log onto associated messaging platforms 24 and 28, respectively, with the same or different encrypted password. Messaging platforms 24 and 28 verify the validity of the encrypted passwords at step 202. If an encrypted password is not valid, messaging platform 24 or 28 denies access to the associated alternative platform 30 or 36, respectively, at step 204, and the method ends. Messaging platforms 24 and 28 log onto associated mainframe platforms 14 and 18 with the same or different encrypted passwords at step 206. At step 208, mainframe platforms 14 and 18 verify the validity of the encrypted passwords received from messaging platforms 24 and 28, respectively. If an encrypted password is invalid, mainframe platform 14 or 18 denies access to the associated messaging platform 24 or 28, respectively, at step 209, and the method ends.

Some or all alternative platforms 30 and 36 may log onto associated messaging platforms 24 and 28, respectively, independent of some or all messaging platforms 24 and 28 logging onto associated mainframe platforms 14 and 18, respectively, and may do so serially, more or less simultaneously, or in any other appropriate manner. If the encrypted passwords are valid, the mainframe platforms 14 and 18 communicate the user password rules to messaging platforms 24 and 28, respectively, at step 210, and the messaging platforms 24 and 28 communicate the user password rules to alternative platforms 30 and 36, respectively, at step 212. Alternative platforms 30 and 36 store user password rules at step 214. The user password rules may be temporarily stored at messaging platforms 24 and 28 before being communicated to alternative platforms 30 and 36, according to operation of system 8.

At step 218, a user provides a current user password, possibly along with a user identification or other security information, using alternative platform client computer 34 or 40. Alternative platform client computer 34 or 40 communicates the current user password and security information to associated alternative platform 30 or 36, respectively, at step 220. Alternative platform 30 or 36 verifies the validity of the current user password at step 222 and, if the current user password is not valid, denies the user access at step 224, and the method ends. If the current user password is valid, alternative platform 30 or 36 provides the user with access to alternative platform client computer 34 or 40 at step 226, with or without providing access to applications and data supported in alternative computer operating environments 11 or 12, respectively. The validity of the user identification may also need to be verified before providing access. In one embodiment, alternative platform 30 or 36 provides the user with access only to selected applications and data within alternative computer operating environment 11 or 12, respectively, according to the current user password.

At step 228, the user provides a new password using alternative platform client computer 34 or 40. At step 230, the alternative platform client computer 34 or 40 communicates the new user password to associated alternative platform 30 or 36, respectively, and at step 232, alternative platform 30 or 36 communicates the new user password to associated messaging platform 24 or 28, respectively. At step 234, messaging platform 24 or 28 communicates the new user password to associated mainframe platform 14 or 18. At step 236, mainframe platform 14, 16, or 18 stores the new user password and, at step 238, communicates a broadcast message containing the new user password to some or all of the other mainframe platforms 14, 16, and 18. For example, if the password was changed using alternative platform client computer 34, mainframe platform 14 may be a primary platform and may communicate a broadcast message containing the new user password to secondary mainframe platforms 16 and 18 at step 238.

At step 240, each mainframe platform 14, 16, and 18 that received the broadcast message stores the new user password. At step 242, mainframe platforms 14, 16, and 18 having received the new user password communicate the new user password to associated messaging platforms 24, 26, and 28, respectively. At step 244, each messaging platform 24, 26, and 28 that received the new user password communicates a broadcast message containing the new user password to some or all alternative platforms 30 and 36 that did not initially receive the new user password from alternative platform client computer 34 or 40. The present invention contemplates communicating the new password directly to alternative platforms 30 or 36 within the same alternative operating environment 11 or 12, respectively, as the alternative platforms 30 or 36 that initially received the new user password without first communicating the new user password to one or more mainframe platforms 14, 16, or 18. At step 246, each alternative platform 30 and 36 that received the broadcast message stores the new user password, synchronizing the new user password between mainframe operating environment 10 and alternative operating environments 11 and 12.

At step 248, the user provides the new user password using mainframe client computer 22. Mainframe client computer 22 communicates the new user password to mainframe access module 20 at step 250, and, at step 252, mainframe access module 20 accesses a user password database using mainframe platform 18. Mainframe access module 20 verifies the validity of the new user password at step 254. If the new user password is not valid, then mainframe access module 20 denies the user access to applications and data in mainframe operating environment 10 at step 256, and the method ends. If the new user password is valid, then mainframe access module 20 provides the user with access to some or all applications and data supported in mainframe operating environment 10 at step 258. In one embodiment, mainframe access module 20 provides the user with access only to selected applications and data in mainframe operating environment 10. After the user gains access to the applications and data, the methods ends.

Although the present invention has been described with several embodiments, a person skilled in the art could make various alterations, modifications, and additions without departing from the spirit and scope of the present invention as defined in the appended claims.

What is claimed is:

1. A system for synchronizing a user password between mainframe and alternative computer operating environments, comprising:

a mainframe access module operable to receive a current user password from an associated mainframe client computer and to provide a user with access to selected applications or data in the mainframe operating environment according to the current user password, the mainframe access module further operable to receive a new user password in response to providing the access and to communicate the new user password;

a mainframe platform coupled to the mainframe access module and operable to receive the new user password, store the new user password, and communicate the new user password;

a messaging platform coupled to the mainframe platform and operable to receive the new user password from the mainframe platform, the messaging platform further operable to communicate a broadcast message containing the new user password; and a plurality of alternative platforms each coupled to the messaging platform and operable to receive the broadcast message from the messaging platform, each alternative platform further operable to store the new user password to synchronize the new user password between the mainframe and alternative computer operating environments, each alternative platform further operable to receive the new user password from an associated alternative platform client computer and, in response, to provide the user with access to the alternative platform client computer.

2. The system of claim 1, further comprising:

a second mainframe platform coupled to the mainframe platform and operable to receive a broadcast message from the mainframe platform containing the new user password, store the new user password, and communicate the new user password to an associated second messaging platform.

3. The system of claim 2, wherein the mainframe platform is a primary mainframe platform that stores all user passwords for the mainframe and alternative operating environments and the second mainframe platform is a secondary mainframe platform that stores a subset of all user passwords for the mainframe and alternative operating environments.

4. The system of claim 2, wherein the mainframe platform is a secondary mainframe platform that stores a subset of all user passwords for the mainframe and alternative operating environments and the second mainframe platform is a primary mainframe platform that stores all user passwords for the mainframe and alternative operating environments.

5. The system of claim 2, further comprising a second plurality of alternative platforms, each alternative platform in the second plurality coupled to the second messaging platform and operable to receive a broadcast message from the second messaging platform containing the new user password and to store the new user password to synchronize the new user password between the mainframe and second alternative computer operating environments, each alternative platform in the second plurality further operable to receive the new user password from an associated second alternative platform client computer and, in response, to provide the user with access to the second alternative platform client computer.

6. The system of claim 1, wherein the alternative operating environment comprises a client-server computer network.

7. The system of claim 1, wherein:
each alternative platform is further operable to receive a second new user password in response to providing the user with access and to communicate the second new user password to the messaging platform;
the messaging platform is further operable to receive the second new user password and to communicate the second new user password to the mainframe platform;
the mainframe platform is further operable to receive the second new user password and store the second new user password to synchronize the second new user password between the mainframe and alternative operating environment; and
the mainframe access module is further operable to receive the second new user password from the mainframe client computer and provide the user with access to applications and data in the mainframe operating environment according to the second new user password.

8. A method of synchronizing a user password between mainframe and alternative computer operating environments, comprising:
communicating a current user password from a mainframe client computer to a mainframe access module;
providing a user associated with the mainframe client computer with access to applications and data in the mainframe operating environment according to the current user password;
communicating a new user password from the mainframe client computer to the mainframe access module;
communicating the new user password from the mainframe access module to a mainframe platform;
storing the new user password at the mainframe platform;
communicating the new user password from the mainframe platform to an associated messaging platform;
communicating a broadcast message containing the new user password from the messaging platform to a plurality of associated alternative platforms;
storing the new user password at each alternative platform to synchronize the user password between the mainframe and alternative operating environments;
receiving, at a particular alternative platform, the new user password from an alternative platform client computer; and
providing the user with access to the alternative platform client computer.

9. The method of claim 8, further comprising:
communicating a broadcast message containing the new user password from the mainframe platform to a second mainframe platform;
storing the new user password at the second mainframe platform; and
communicating the new user password from the second mainframe platform to an associated second messaging platform.

10. The method of claim 9, wherein the mainframe platform is a primary mainframe platform that stores all user passwords for the mainframe and alternative operating environments and the second mainframe platform is a secondary mainframe platform that stores a subset of all user passwords for the mainframe and alternative operating environments.

11. The method of claim 9, wherein the mainframe platform is a secondary mainframe platform that stores a subset of all user passwords for the mainframe and alternative operating environments and the second mainframe platform is a primary mainframe platform that stores all user passwords for the mainframe and alternative operating environments.

12. The method of claim 9, further comprising:
communicating a broadcast message containing the new user password from the second messaging platform to a second plurality of alternative platforms;
storing the new user password at each alternative platform in the second plurality to synchronize the new password between the mainframe and second alternative operating environment;
receiving at an alternative platform in the second plurality, the new user password from an associated second alternative platform client computer; and
providing the user with access to the second alternative platform client computer.

13. The method of claim 8, wherein the alternative operating environment comprises a client-server computer network.

14. The method of claim 8, further comprising:
receiving a second new user password at the particular alternative platform in response to providing the user with access to the alternative platform client computer;
communicating the second new user password from the alternative platform to the messaging platform;
communicating the second new user password from the messaging platform to the mainframe platform;
storing the second new user password at the mainframe platform to synchronize the second new user password between the mainframe and alternative operating environments;
receiving the second new user password from the mainframe client computer; and
providing the user with access to applications and data in the mainframe operating environment according to the second new user password.

15. A method of synchronizing a user password between mainframe and alternative computer operating environments, comprising:

communicating a current user password from an alternative platform client computer to an associated alternative platform;

providing a user with access to the alternative platform client computer according to the current user password;

communicating a new user password from the alternative platform client computer to the alternative platform;

communicating the new user password from the alternative platform to an associated messaging platform;

communicating the new user password from the messaging platform to an associated mainframe platform;

storing the new user password at the mainframe platform;

communicating a broadcast message containing the new user password from the messaging platform to a plurality of alternative platforms;

storing the new user password at each alternative platform in the plurality to synchronize the user password between the mainframe and alternative operating environments;

receiving, at an alternative platform in the plurality, the new user password from a second alternative platform client computer; and providing the user with access to the second alternative platform client computer according to the new user password.

16. The method of claim 15, further comprising:

receiving, at a mainframe access module coupled to the mainframe platform, the new user password from an associated mainframe client computer; and providing the user with access to applications and data in the mainframe operating environment.

17. The method of claim 15, further comprising:

communicating the new user password from the mainframe platform to a second mainframe platform; and storing the new user password at the second mainframe platform.

18. The method of claim 17, wherein the mainframe platform is a primary mainframe platform that stores all user passwords for the mainframe and alternative operating environments and the second mainframe platform is a secondary mainframe platform that stores a subset of all user passwords for the mainframe and alternative operating environments.

19. The method of claim 17, further comprising:

communicating the new user password from the second mainframe platform to an associated second messaging platform;

communicating a second broadcast message containing the new user password from the second messaging platform to an associated second plurality of alternative platforms;

storing the new user password at each alternative platform in the second plurality;

receiving, at an alternative platform in the second plurality, the new user password from an associated second alternative platform client computer; and providing the user with access to the second alternative platform client computer according to the new user password.

20. The method of claims 15, wherein the alternative operating environment comprises a client-server computer network.

* * * * *

UNITED STATES PATENT AND TRADEMARK OFFICE
CERTIFICATE OF CORRECTION

PATENT NO.       : 7,055,042 B1
APPLICATION NO.  : 09/276407
DATED            : May 30, 2006
INVENTOR(S)      : Richard Bruce Gough et al.

It is certified that error appears in the above-identified patent and that said Letters Patent is hereby corrected as shown below:

Assignee: "Electronics Data Systems Corporation" should be changed to read --Electronic Data Systems Corporation--.

Signed and Sealed this

Second Day of January, 2007

JON W. DUDAS
*Director of the United States Patent and Trademark Office*